US012792202B2

(12) United States Patent
McCrackin et al.

(10) Patent No.: US 12,792,202 B2
(45) Date of Patent: Nov. 10, 2026

(54) CONFIGURABLE NON-DESTRUCTIVE TESTING DEVICE

(71) Applicant: Baker Hughes Holdings LLC, Houston, TX (US)

(72) Inventors: Sheldon McCrackin, Oklahoma City, OK (US); Matthew Pankow, Skaneateles, NY (US)

(73) Assignee: Baker Hughes Holdings LLC, Houston, TX (US)

( * ) Notice: Subject to any disclaimer, the term of this patent is extended or adjusted under 35 U.S.C. 154(b) by 158 days.

(21) Appl. No.: 18/456,895

(22) Filed: Aug. 28, 2023

(65) Prior Publication Data

US 2024/0094878 A1 Mar. 21, 2024

Related U.S. Application Data

(60) Provisional application No. 63/407,771, filed on Sep. 19, 2022.

(51) Int. Cl.

| | |
|---|---|
| ***G06F 3/0484*** | (2022.01) |
| ***G01N 21/17*** | (2006.01) |
| ***G01N 21/954*** | (2006.01) |

(52) U.S. Cl.

CPC ........... *G06F 3/0484* (2013.01); *G01N 21/17* (2013.01); *G01N 21/954* (2013.01); *G01N 2021/177* (2013.01); *G01N 2021/9542* (2013.01); *G01N 2201/1266* (2013.01)

(58) Field of Classification Search

None

See application file for complete search history.

(56) References Cited

U.S. PATENT DOCUMENTS

| | | | | |
|---|---|---|---|---|
| 2014/0207403 | A1 | 7/2014 | Messinger et al. | |
| 2014/0207417 | A1* | 7/2014 | Messinger ....... | G06Q 10/06311 702/187 |
| 2015/0350639 | A1 | 12/2015 | Maule et al. | |
| 2017/0016862 | A1 | 1/2017 | Holmes et al. | |
| 2019/0331613 | A1* | 10/2019 | Morris ................. | G01N 21/954 |
| 2021/0366104 | A1 | 11/2021 | Jana et al. | |

OTHER PUBLICATIONS

International Search Report and Written Opinion Received for PCT Patent Application No. PCT/US2023/074058, mailed on Jan. 8, 2024, 12 pages.

* cited by examiner

*Primary Examiner* — Ifedayo B Iluyomade

(74) *Attorney, Agent, or Firm* — Mintz, Levin, Cohn, Ferris, Glovsky and Popeo, P.C.

(57) ABSTRACT

A method includes receiving, by a data processor of a non-destructive testing (NDT) device, data characterizing an inspection point identifying an asset to be inspected using the NDT device. The method also includes determining, by the data processor, an inspection procedure associated with the asset based on the inspection point included in the received data. In addition, the method includes determining, by the data processor, a user interface configuration of the NDT device, the user interface configuration including a graphical interface configuration provided via a graphical user interface displayed on a display of the NDT device and a manual interface configuration corresponding to an actuated interface device of the NDT device. The method further includes configuring, by the data processor, the NDT device to perform the inspection procedure by applying the determined user interface configuration.

18 Claims, 4 Drawing Sheets

CONFIGURABLE NON-DESTRUCTIVE TESTING DEVICE

CROSS-REFERENCE TO RELATED APPLICATIONS

This application claims the benefit of and priority under 35 U.S.C. § 119 to U.S. Provisional Patent Application No. 63/407,771 filed Sep. 19, 2022, the entire contents of which is hereby expressly incorporated by reference herein.

BACKGROUND

Non-destructive testing (NDT) is an inspection technique that can be used in inspections and/or evaluation of an asset for determining an anomaly or undesired state without causing damage to an asset. NDT can be used in industrial systems and facilities, such as power generation equipment and facilities, oil and gas equipment and facilities, aircraft equipment and facilities, manufacturing equipment and facilities, and the like. NDT can be employed to inspect industrial assets located at one or more inspection points within these systems or facilities.

SUMMARY

The details of one or more variations of the subject matter described herein are set forth in the accompanying drawings and the description below. Other features and advantages of the subject matter described herein will be apparent from the description and drawings, and from the claims.

In one aspect of the present disclosure, a method is provided. The method can include receiving, by a data processor of a non-destructive testing (NDT) device, data characterizing an inspection point identifying an asset to be inspected using the NDT device. In addition, the method can include determining, by the data processor, an inspection procedure associated with the asset based on the inspection point included in the received data. The method can also include determining, by the data processor, a user interface configuration of the NDT device. The user interface configuration includes a graphical interface configuration provided via a graphical user interface displayed on a display of the NDT device and a manual interface configuration corresponding to an actuated interface device of the NDT device. The method can further include configuring, by the data processor, the NDT device to perform the inspection procedure by applying the determined user interface configuration.

In some embodiments, the graphical interface configuration can include a graphical prompt to be displayed via the graphical user interface, the graphical prompt corresponding to an inspection task included in the inspection procedure.

In some embodiments, the manual interface configuration can include an actuation input pattern to be received via the actuated interface device, the actuation input pattern corresponding to a second inspection task included in the inspection procedure.

In some embodiments, responsive to receiving the actuation input pattern, the method can include controlling, by the NDT device, an actuator associated with an image sensor used to perform the inspection procedure.

In some embodiments, the received data is received via an inspection point selection provided via the graphical user interface. The inspection point selection includes previously performed inspection procedures associated with the inspection point.

In some embodiments, the received data is received via an image sensor of the NDT device and can include an image of the inspection point.

In some embodiments, the received data includes image data of the inspection point captured by the image sensor.

In some embodiments, the actuated interface device can include at least one of a button, slider, joystick, knob, pointing stick or touchpad.

In some embodiments, the NDT device can include a borescope or a video probe.

In some embodiments, the asset can include at least one of compressor, a turbine, an engine, or a combustor.

In another aspect of the present disclosure, a NDT device is disclosed. The NDT device can include a sensor, an actuated interface device, a data processor communicatively coupled to the sensor and the actuated interface device, a display coupled to the data processor, and a memory coupled to the data processor. The memory and storing computer-readable executable instructions, which when executed by the data processor perform operations can include receive data characterizing an inspection point identifying an asset to be inspected using the NDT device, determining an inspection procedure associated with the asset based on the inspection point included in the received data, determine a user interface configuration of the NDT device, the user interface configuration including a graphical interface configuration provided via a graphical user interface displayed on the display and a manual interface configuration corresponding to the actuated interface device, and configure the NDT device to perform the inspection procedure by applying the determined user interface configuration.

In some embodiments, the graphical interface configuration includes a graphical prompt to be displayed via the graphical user interface, the graphical prompt corresponding to an inspection task included in the inspection procedure.

In some embodiments, the manual interface configuration includes an actuation input pattern to be received via the actuated interface device, the actuation input pattern corresponding to a second inspection task included in the inspection procedure.

In some embodiments, the NDT device controls an actuator associated with a sensor used to perform the inspection procedure, responsive to receiving the actuation input pattern.

In some embodiments, the received data is received via an inspection point selection provided via the graphical user interface. The inspection point selection including previously performed inspection procedures associated with the inspection point.

In some embodiments, the received data is received via an image sensor of the NDT device and includes an image of the inspection point.

In some embodiments, the received data includes image data of the inspection point captured by the image sensor.

In some embodiments, the actuated interface device includes at least one of a button, a slider, a joystick, a knob, a pointing stick or a touchpad.

In some embodiments, the NDT device includes a borescope or a video probe.

In some embodiments, the asset includes at least one of a compressor, a turbine, an engine, or a combustor.

In another aspect of the present disclosure, a non-transitory computer-readable medium storing instructions is provided. The non-transitory computer-readable medium storing instructions which when executed by at least one data processor, cause the at least one data processor to perform a method. In addition, the method can include determining, by the data processor, an inspection procedure associated with the asset based on the inspection point included in the received data. The method can also include determining, by the data processor, a user interface configuration of the NDT device. The user interface configuration can include a graphical interface configuration provided via a graphical user interface displayed on a display of the NDT device and a manual interface configuration corresponding to an actuated interface device of the NDT device. The method can further include configuring, by the data processor, the NDT device to perform the inspection procedure by applying the determined user interface configuration.

DESCRIPTION OF DRAWINGS

These and other features will be more readily understood from the following detailed description taken in conjunction with the accompanying drawings, in which.

Figure 1:
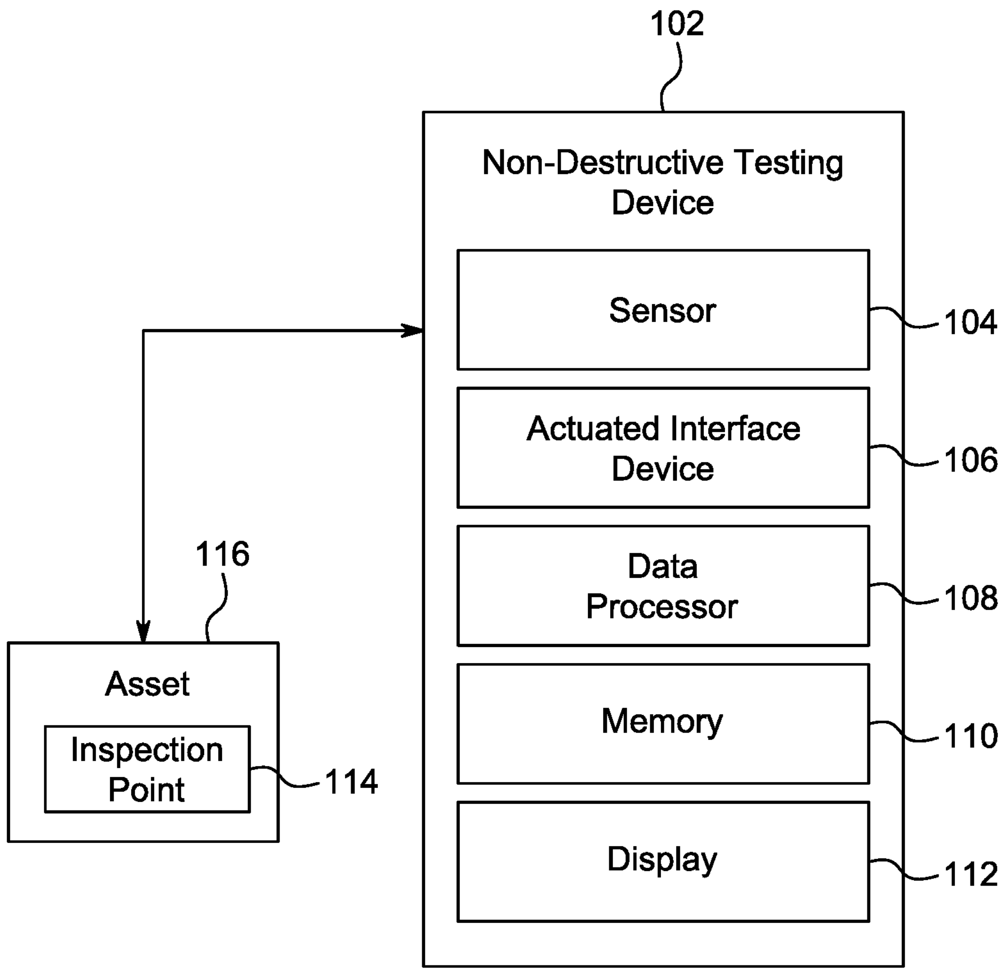
FIG. 1 illustrates a block diagram of a NDT device, according to some implementations of the current subject matter.

It is noted that the drawings are not necessarily to scale. The drawings are intended to depict only typical aspects of the subject matter disclosed herein, and therefore should not be considered as limiting the scope of the disclosure.

DETAILED DESCRIPTION

NDT can include use of NDT devices such as borescopes, video scopes, video probes, portable X-ray inspection devices, portable eddy current inspection devices, or the like. The NDT devices can be specifically used for inspections at various inspection points within an asset. The asset can include, for example, a compressor, a combustor, a turbine, or the like. The NDT devices can include user interfaces and/or a set of buttons useful in allowing users to perform various monitoring functions. The user can use the user interfaces and buttons to identify and capture the anomaly or simply inspect spaces at various inspection points within the asset. Each inspection point can have a unique set of data to be captured and/or a unique set of actions to be carried out against the data captured (i.e., image adjustments including brightness, dark boost, and/or measurements including selecting a measurement type, placing cursors, saving data). Some of these actions can often cause a workflow (which could be comprised of multiple physical button pushes) to occur in a repetitive manner, over and over again at each inspection point. The workflow can be completed by a user providing inputs to a series of physical buttons on the NDT device. For example, a borescope user can navigate through various user interface (UI) elements using the physical buttons. Completing a workflow by a series of physical button pushes can be a manual process which can occur multiple times in the same inspection or at the same inspection point. For example, to collect data of an anomaly in an asset, the user has to take a series of images, use soft tools provided by the NDT device to mark the anomaly, and then process the images to obtain measurements of the anomaly. At times, there could be multiple inspection point in the asset, which can consume of time needed to perform the NDT. As a result, the manual workflow process may lead to an increase in inspection time, longer idle time for the assets, and could cause losses to the asset holder.

Present embodiments relate to an NDT device such as, a borescope. The NDT device can include user-selectable buttons that can be configured based on various inspection points and/or an asset being inspected. In some embodiments, the NDT device can be used to inspect various assets, including gas turbines, compressors, engines, or the like. These inspections can be carried out at various inspection points within or associated with the asset (i.e., compressor, combustor, turbine, or the like). Each inspection point may have unique set of data to be captured and/or a unique set of actions to be carried out based on the data that is captured (i.e., image adjustments including brightness, dark boost, and/or measurements including selecting a measurement type, placing cursors, or the like). These actions can often cause the same workflow (which could be comprised of multiple physical button pushes) to occur over and over again at each inspection point. A method to configure a physical button to complete a workflow (series of button pushes) unique to the inspection point is disclosed. The configured physical button can allow a user to execute the workflow by actuation of the button. Additionally, the inspection point can either be defined in a menu driven inspection (MDI) or automatically determined by image processing and analytics.

The NDT device enables the user to execute a workflow with a press of the physical button. When the user actuates the button, the NDT device performs the workflow, which would have required the user to perform a series of button presses. The configuring of the physical button to enable the user to complete a workflow significantly saves time which otherwise would have required several minutes or even hours. This leads to a significant reduction in time to complete various repetitive tasks that involve, for example, taking several pictures manually, performing measurements and other tasks of a given workflow. The NDT device 102 executes all the steps of the workflow/task as a result of a single button.

FIG. 1 illustrates an NDT device 102, according to certain embodiments described herein. The NDT device 102 can be employed in industries to inspect assets. Some examples of assets can include, but are not limited to a power generation equipment, oil and gas equipment, aircraft equipment, manufacturing equipment, a compressor, a turbine, an engine, a combustor, and the like. Data obtained from the inspection, that is, inspection data, can be presented to a human operator (also referred to as a user) for analysis and/or can be further processed by a computing device to obtain information such as a working condition, health, and stability of the machine. The NDT device 102 can acquire inspection data associated with an operation of the machine without damaging the machine. In some embodiments, the NDT device 102 can include, but are not limited to a borescope, a video scope, a video probe, a portable X-ray inspection device, a portable eddy current inspection device, or the like.

The NDT device 102 may include a sensor 104, an actuated interface device 106, a data processor 108, a memory 110, and a display 112. In one embodiment, the sensor 104 may be placed in a conduit (not shown) which can be further supported by one or more actuators. In one example, the sensor 104 can be a camera sensor. In some examples, the camera sensor may be coupled with an optical sensor and/or a light source for the purposes of illuminating the inspection point. The inspection point 114 can be associated with an asset 116 to be inspected using the NDT device 102. In some examples, the sensor 104 may include temperature sensor, proximity sensor, pressure sensor, or the like.

The actuated interface device 106 can be a physical interface and/or a virtual interface through which a user may provide inputs and control the NDT device 102. The physical interface can be one or more a button, slider, joystick, knob, pointing stick and touchpad. The virtual interface can be, for example, a graphical user interface that can be provided on the display 112 of the NDT device 102, such as a touchscreen.

The data processor 108 can be communicatively coupled to the sensor 104 and the actuated interface device 106, and controls the NDT device 102. The data processor 108 can be a general-purpose processor or a special-purpose processor for the purpose of performing data processing for the NDT device 102.

The memory 110 can be coupled to the data processor 108 and can store computer-readable executable instructions. The executable instructions may include, inter alia, an operating system for the NDT device 102, drivers, and executable instructions for performing operations of the NDT device 102. The data processor 108 can execute the executable instructions to perform operations. In some examples, the memory 110 may include an image recognition algorithm, a computer vision analytics, automated image processing and analysis functions, or the like, that can be automatically initiated and can be configured to identify the asset 116 or the inspection point 114 associated with the asset 116 from the image of the inspection point 114. The inspection point 114 can be a point of interest for inspection in the asset 116. The image recognition algorithm or automated image processing and analysis functions can be trained on training data, including images of multiple inspection point features in multiple inspection regions (e.g., different types of defects in multiple industrial machines) for different assets. For example, the training data can include images of defects (e.g., crack, tear, rub, dent, coating loss, missing material, erosion, excess material, a fissure, or a combination thereof) in industrial machines (e.g., turbines, automotive engines, heat exchangers, industrial piping, or the like). In some implementations, a previously trained image recognition algorithm can be stored in the memory 110. The memory 110 may include configurations for one or more physical buttons that can be configured on the NDT device 102 in order to complete a specified workflow at a particular inspection point 114. In some embodiments, the configurations can be input from a list of pre-defined workflows. In some embodiments, the configurations can be recorded by defining a user workflow by asking the user to input their custom workflow into the user interface. In one embodiment, the memory 110 may include any computer-readable storage medium known in the art, including, for example, volatile memory, such as Static Random Access Memory (SRAM) and Dynamic Random Access Memory (DRAM), and/or a non-volatile memory, such as Read Only Memory (ROM), erasable programmable ROM, flash memories, hard disks, optical disks, and magnetic tapes.

The display 112 can be communicatively coupled to the data processor 108. In some examples, the display 112 can be a high definition (HD) display, Light Emitting Diode (LED) display Liquid Crystal Display (LCD) display, or the like. In some embodiments, the display 112 can be a touchscreen enabling the user to use the display as an input and output device.

The NDT device 102 may include elements such as a light unit, one or more motors, or the like, which can be controlled through the actuators. The actuator, and the NDT device elements, can be controlled through the actuated interface device 106. In some examples, the actuators can be electric, pneumatic, or ultrasonically operated motors or solenoids, shape alloy, electroactive polymers, dielectric elastomers, polymer muscle material, or the like.

In some embodiments, the NDT device 102 can be used in inspecting the asset 116. The conduit of the NDT device 102 can be moved to an inspection point in the asset 116 to be inspected using the NDT device 102. The inspection point can be a specific location inside the asset 116, outside the asset 116, or inside and outside the asset 116. The NDT device 102 can receive inputs through the actuated interface device 106 such as a joystick, keypad, or the like. The NDT device 102 can control the actuator associated with the sensor 104 used to perform an inspection procedure, responsive to receiving the actuation input pattern. The inspection procedure can include, but is not limited to, moving the sensors, controlling lighting, capturing images from different perspectives, performing measurements, or the like. In one or more embodiments, one or more inspection procedures can have a set of tasks and series of steps or a workflow to achieve an inspection goal. In one example, the inspection goal can be a routine check. In some examples, the inspection goal can be anomaly detection and measurement. Some examples of anomalies can include, but are not limited to, cracks, dents, deposits, deterioration, or the like. Also, each inspection point may have a unique set of data to be captured and/or a unique set of actions to be carried out against the data captured (e.g., image adjustments including brightness, dark boost, and/or measurements including selecting a measurement type, or placing cursors). These actions can often cause the same workflow (which could be comprised of multiple physical button pushes) to occur over and over again at each inspection point. In some embodiments, there can be a graphical user interface corresponding to each of the plurality of tasks.

Once sensor 104 and the conduit are positioned with respect to the inspection point, the user or NDT device 102 may begin the inspection procedure. In some embodiments, the NDT device 102 may receive data characterizing the inspection point identifying the asset 116. In one embodiment, the data can be input received via an inspection point selection provided via the graphical user interface by the user. For example, the user may capture an image of the inspection point through an image sensor using the actuated interface device 106. The user may then input the captured image of the inspection point via the graphical user interface for analysis. The data processor 108 may analyze the image, recognize the inspection point, and may provide inspection point selections. The user may then perform the inspection point selection. In one or more embodiments, the inspection point selections may include previously performed inspection procedures associated with the inspection point. Responsive to the selected inspection point, the data processor 108 may determine an inspection procedure associated with the asset 116 based on the selected inspection point.

Alternatively, in some embodiments, the received data can be received via the image sensor (part of the sensor 104) of the NDT device 102 and may include an image of the inspection point. Responsive to the received data, the data processor 108 may determine an inspection procedure associated with the asset 116 based on the inspection point included in the received data. The memory 110 may have predefined inspection procedures associated with the inspection points of the assets. The data processor 108 may determine one or more appropriate inspection procedures from the predefined inspection procedures based on the inspection point included in the received data.

The data processor 108 may determine a user interface configuration of the NDT device 102 for the inspection procedure(s). In one or more embodiments, the user interface configurations may include a graphical interface configuration provided via a graphical user interface displayed on the display 112 and a manual interface configuration corresponding to the actuated interface device 106. In some embodiments, the graphical interface configuration can include a graphical prompt to be displayed via a graphical user interface. The graphical prompt can correspond to one or more inspection tasks included in the inspection procedure. The manual interface configuration can include an actuation input pattern to be received via the actuated interface device 106. The actuation input pattern can correspond to a specific inspection task included in the inspection procedure. The user interface configuration may include inspection procedure (e.g., a series of steps of workflow) that can be performed automatically or by triggering a single button configured for executing a workflow.

The data processor 108 can configure the NDT device 102 to perform the inspection procedure by applying the determined user interface configuration. For example, considering routine inspection procedure, the NDT device 102 can several pictures of the inspection point for routine inspection and analysis without requiring the user to perform each inspection task by manually taking a series of pictures from different angles. In another example, considering anomaly detection and analysis, the NDT device 102 can perform the inspection task by taking several pictures of an anomaly at the inspection point, and can measure the anomaly, without requiring the user to take pictures of anomaly manually and perform measurements.

As a result, a configured button on the NDT device 102 enables performing the inspection procedure by applying the determined user interface configuration. This leads to a significant reduction in time to complete various repetitive tasks that involve, for example, taking several pictures manually, performing measurements and other tasks of a given workflow. The NDT device 102 executes all the steps of the workflow/task as a result of a single button.

Additionally, these repetitive tasks can be uniquely identified (either by definition or automatically via automated image processing and analysis techniques) in multiple inspection points. In some embodiments, workflow(s) that need to be carried out in each scene can be uniquely defined. These defined workflow(s) can be stored in the memory 110 for future use of the NDT device 102.

Figure 2:
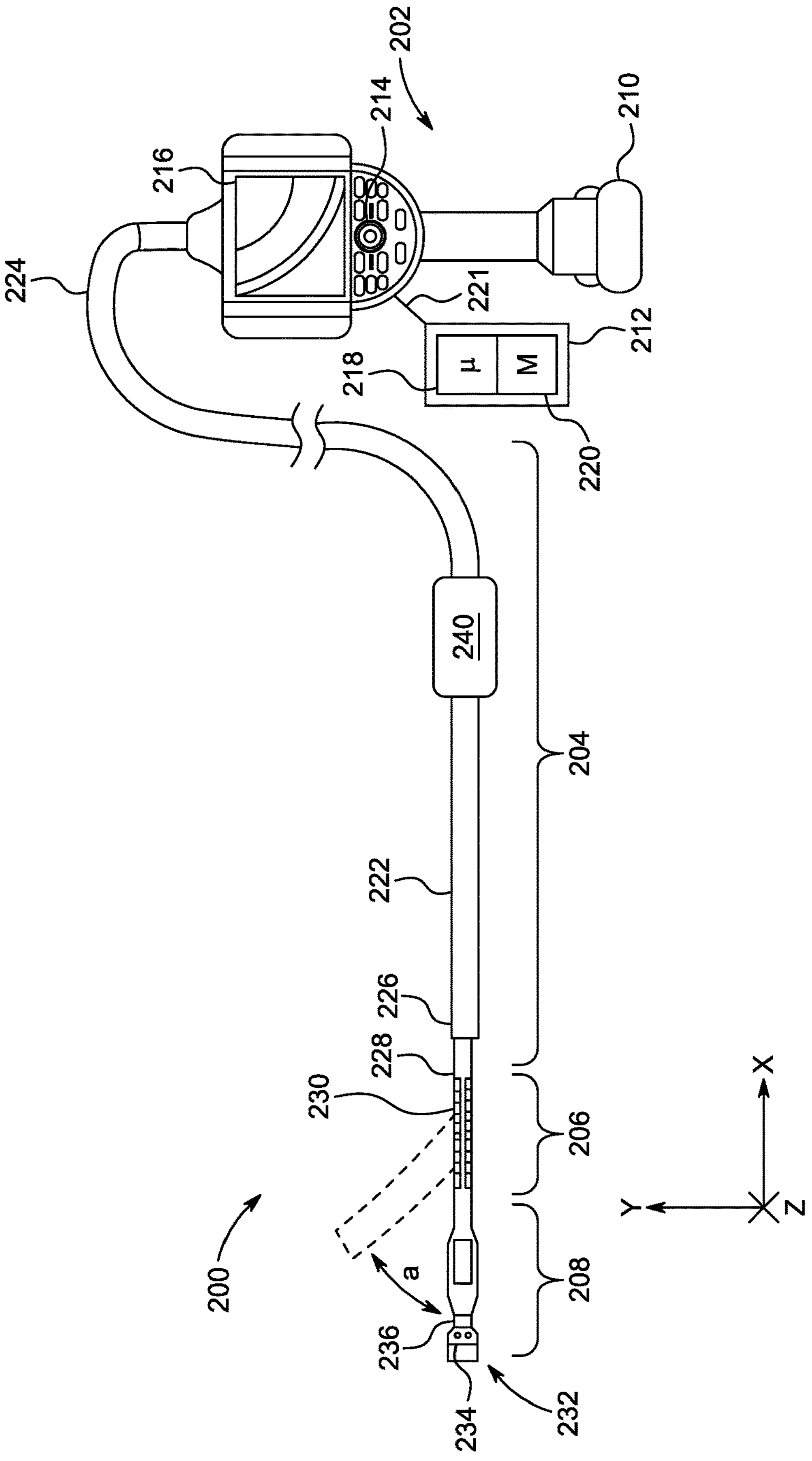
FIG. 2 is a diagram illustrating an exemplary embodiment of the NDT device in a form of a borescope, according to some implementations of the current subject matter.

FIG. 2 is a diagram illustrating an exemplary embodiment of the NDT device 102 in a form of a borescope 200 into which the embodiments of the disclosure are implemented. The borescope 200 can include a control unit 202, a conduit section 204, a bendable articulation section 206, and a head section 208. In one embodiment, the sections 204, 206, 208 can have different lengths and can be integral with one another, or can be detachable from one another. As depicted, the conduit section 204 can be suitable for insertion into a variety of different targets, such as inside turbomachinery, equipment, pipes, conduits, underwater locations, curves, bends, inside or outside of an aircraft system, or the like.

The borescope 200 can include a probe driver 240 coupled to the conduit section 204. The probe driver 240 can include a motor (not shown) configured to translate and/or rotate one or more of the sections 204, 206, 208 (e.g., to facilitate insertion of the probe head 208 into the target). In some embodiments, orientation/position of a portion of the head section 208 (e.g., camera, light source, or the like) can be varied to acquire an inspection region image (e.g., color image, infrared image, or the like). The control unit 202 can include a control unit housing 210, a data processor 212 (similar to the data processor 108), an actuated interface device 214, and a display 216. The data processor 212 can include one or more processor(s) 218 and a readable memory 220 (similar to the memory 110) having computer-readable instructions which can be executed by the processor 218 to actuate the borescope 200. The computer-readable instructions can include an inspection plan based on which the borescope 200 or a portion thereof (e.g., a conduit section 204, a bendable articulation section 206, and a head section 208) can be translated/rotated (e.g., by the probe driver 240). In some implementations, the operation of the probe driver 240 can be based on a control signal (e.g., generated by the data processor 212 based on the inspection plan/user input via GUI display space on display 216 or a computing device, or the like).

The data processor 212 can be communicatively coupled to the control unit 202 via one or more signals 221. The data processor 212 can also be arranged within the control unit housing 210, or can be arranged outside the control unit housing 210. In some implementations, the actuated interface device 214 can be configured to receive user input (e.g., direction controls) to the control unit 202 for actuation of the borescope 200. The display 216 can display visual information being received by the camera (comprising an optical sensor) arranged in the head section 208, which can allow the user to better guide the borescope 200 using the actuated interface device 214. The actuated interface device 214 and the display 216 are communicatively coupled to the data processor 212 via the one or more signals 221, which can be a hard-wired connection or a wireless signal, such as Wi-Fi or Bluetooth. In one implementation, inspection data and/or notifications (e.g., notifications based on inspection data) can be provided on the display 216.

The conduit section 204 can include a tubular housing 222 including a proximal end 224 and a distal end 226. The tubular housing 222 can be a flexible member along its whole length, or can be rigid at the proximal end 224 and become more flexible travelling down the length of the conduit section 204 towards the distal end 226. In certain embodiments, the tubular housing 222 can be formed from a non-porous material to prevent contaminants from entering the borescope 200 via the conduit section 204.

The control unit 202 can be arranged at the proximal end 224 of the tubular housing 222, and the bendable articulation section 206 can be arranged at the distal end of the tubular housing 222. The bendable articulation section 206 can include a bendable neck 228 and washers 230. The bendable neck 228 can be arranged at the distal end 226 of the tubular housing 222, and can be able to be actuated 160° in the Y-Z plane. The bendable neck 228 can be wrapped in a non-porous material to prevent contaminants from entering the borescope 200 via the bendable articulation section 206.

The head section 208 can include a head assembly 232. The head assembly 232 can include one or more light source 234 (e.g., LEDs or a fiber optic bundle with lights at the proximal end), a camera 236 (or multiple cameras such as visible-light camera, IR camera, or the like), and one or more sensors that can be configured to collect data about the surrounding environment. The camera 236 of the borescope 200 can provide images and video suitable for inspection to the display 216 of the control unit 202. The light source 234 can be used to provide illumination when the head section 208 is disposed in locations having low light or no light. The sensor can record data including temperature data, distance data, clearance data (e.g., distance between a rotating element and a stationary element), flow data, and so on.

In some embodiments, the borescope 200 includes a plurality of replacement head assemblies 232. The head assemblies 232 can include tips having differing optical characteristics, such as focal length, stereoscopic views, 2-dimensional (3D) phase views, shadow views, or the like. In some embodiments, the head section 208 can include a removable and replaceable portion of the head section 208. Accordingly, a plurality of the head sections 208, bendable necks 228, and conduit section 204 can be provided at a variety of diameters from approximately one millimeter to ten millimeters or more.

During use, the bendable articulation section 206 and the probe driver 240 can be controlled, for example, by the control inputs (e.g., relative control gestures, physical manipulation device) from the actuated interface device 214 and/or control signals generated by the data processor 212. The directional input can be a joystick, a pointing stick, D-pad, touch pad, trackball, optical sensor, or a touchscreen over the display 216. The actuated interface device 214 can also be a similar device that can be located outside the control unit housing 210 and connected by wire or wireless means. In particular, a set of control inputs can be used to control the bendable articulation section 206 and/or the probe driver 240. The bendable articulation section 206 can steer or "bend" in various dimensions, while the conduit section 204 can translate and/or rotate, using any combination of actuators and wires arranged within the control unit 202, to adjust the orientation (e.g., a positioning) of the head section 208. In some implementations, the control inputs/direction input 214 can be generated by the data processor based on the inspection plan.

The actuators can be electric, pneumatic, or ultrasonically operated motors or solenoids, shape alloy, electroactive polymers, dielectric elastomers, polymer muscle material, or other materials. For example, the bendable articulation section 206 and the probe driver 240 can enable movement of the head section 208 in an X-Y plane, X-Z plane, and/or Y-Z plane. Indeed, the actuated interface device 214 can be used to perform control actions suitable for disposing the head section 208 at a variety of angles, such as the depicted angle α. In this manner, the head section 208 can be positioned to visually inspect desired locations.

Once the head section 208 is in a desired position, the camera 236 can operate to acquire, for example, a stand-still visual image or a continuous visual image, which can be displayed on the display 216 of the control unit 202, and can be recorded by the borescope 200. In embodiments, the display 216 can be multi-touch touch screens using capacitance techniques, resistive techniques, infrared grid techniques, or the like, to detect the touch of a stylus and/or one or more human fingers. Additionally or alternatively, acquired visual images can be transmitted into a separate storage device for later reference.

The data processor 212 can be configured to receive data characterizing an inspection point identifying an asset to be inspected using the borescope 200. The data processor 212 may determine an inspection procedure associated with the asset based on the inspection point included in the received data. The data processor 212 may determine a user interface configuration of the borescope 200. The user interface configuration including a graphical interface configuration provided via a graphical user interface displayed on the display and a manual interface configuration corresponding to the actuated interface device. The data processor 212 may configure the borescope 200 to perform the inspection procedure by applying the determined user interface configuration.

Figure 3:
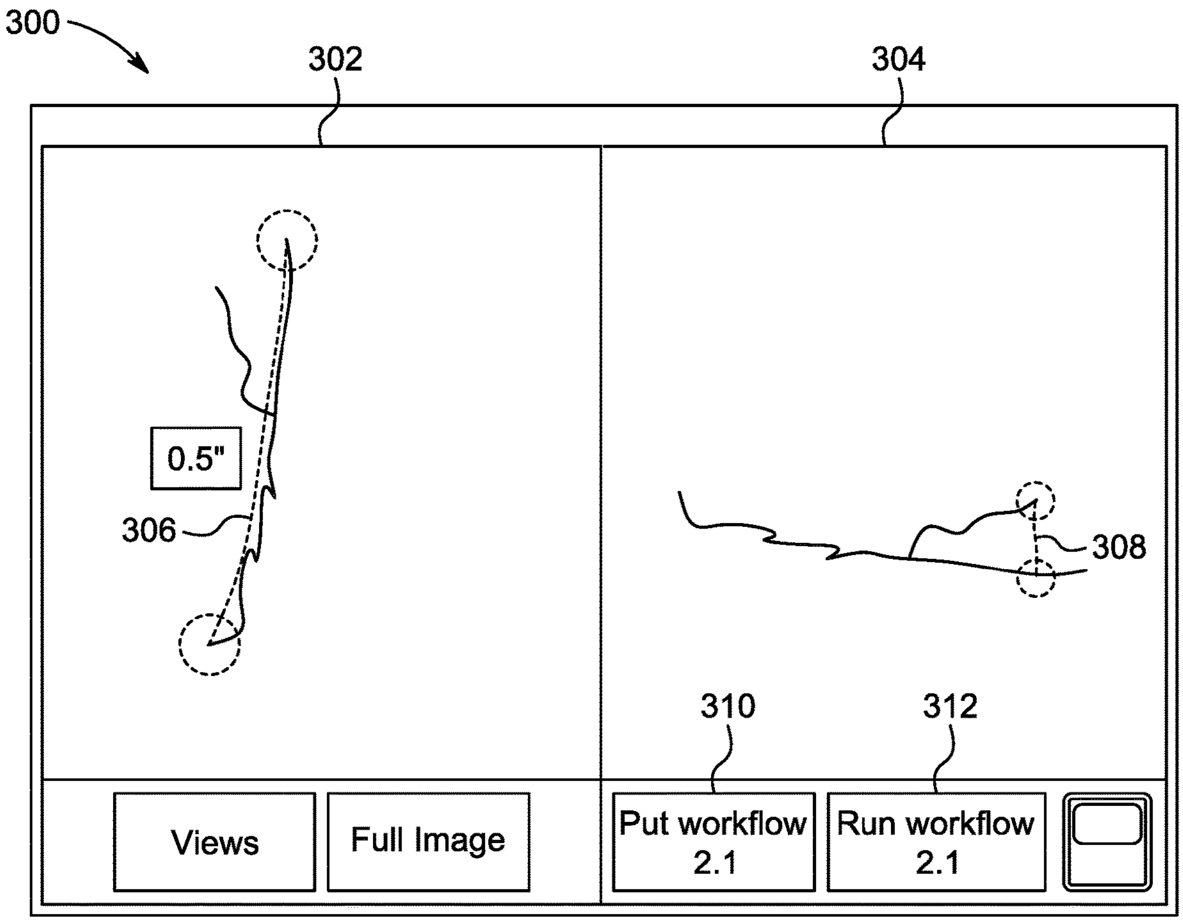
FIG. 3 illustrates an exemplary inspection point that is being inspected by the NDT device, according to some implementations of the current subject matter.

FIG. 3 is a diagram illustrating a graphical user interface (GUI) 300. The GUI 300 can be used to update a user interface configuration based on image, according to certain embodiments. In an example, the data processor 108 can be executing a routine inspection at the inspection point 114. In response to identifying an anomaly, for example, a crack. The data processor 108 may retrieve a user interface configuration corresponding to a detection of an anomaly. Section 302 of the FIG. 3 indicates an anomaly detection by the NDT device 102. In an example, the data processor 108 may update the user interface configuration based on the inspection point 114 to perform anomaly detection at the inspection point 114. In some embodiments, the data processor 108 may then execute the user interface configuration associated with anomaly detection based on a user selection of the button configured for executing the workflow, and provide the inspection data to the user. The inspection data can include measurement type and measurements of the anomaly. As shown in the section 302 and the section 304 of the FIG. 3, the NDT device 102 is performing measurements of the anomaly (as shown by dotted line 306 and 308) from different perspectives. In some examples, the data processor 108 may execute the user interface configuration automatically without any user intervention. Also, as shown in section 304 as an example, the NDT device 102 provides an option "Put workflow 2.1" 310 which when selected causes the NDT device 102 to store and/or record the inspection workflow. Option "Run workflow 2.1" 312 when selected by the user can cause the NDT device 102 to perform the inspection workflow.

Figure 4:
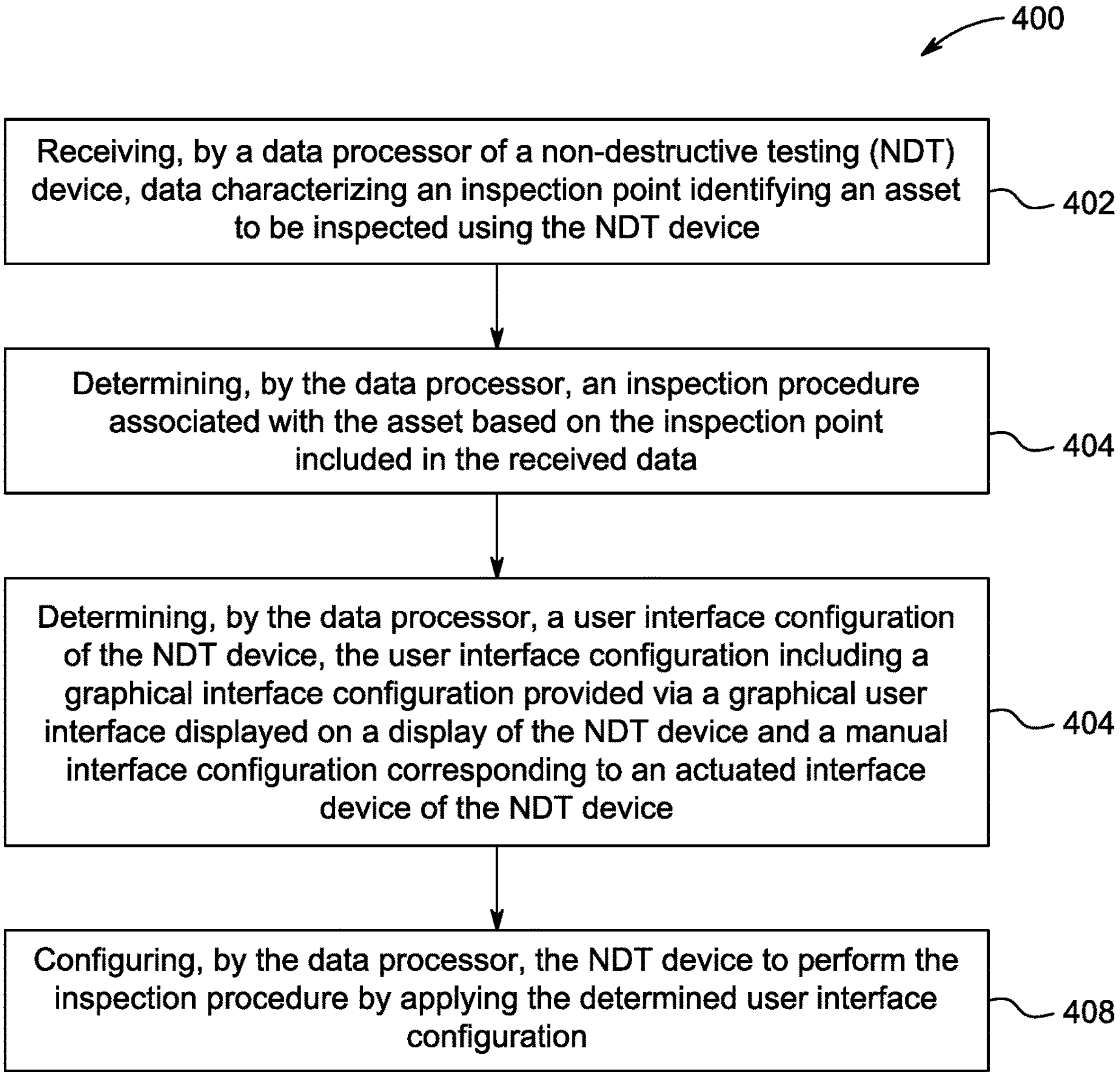
FIG. 4 is a process flow of configuring the NDT device to perform an inspection procedure, according to some implementations of the current subject matter.

FIG. 4 is a process flow diagram of method 400 for configuring the NDT device to perform the inspection procedure, according to certain embodiments.

Step 402 includes receiving, by the data processor 108 of the NDT device 102, data characterizing an inspection point identifying an asset to be inspected using the NDT device 102. In some embodiments, the received data can be received via an inspection point selection provided via the graphical user interface. The inspection point selection can include previously performed inspection procedures associated with the inspection point. In some examples, the received data can be received via the image sensor of the NDT device and can include an image of the inspection point.

Step 404 includes determining, by the data processor 108, an inspection procedure associated with the asset 116 based on the inspection point included in the received data. In some embodiments, inspection procedures can be predefined and can correspond to a particular inspection point of the asset 116, a component of the asset 116, or the asset 116 itself. The inspection procedures can be stored in a memory of the NDT device 102. In some embodiments, the inspection procedures can be stored in a memory of a computing device that is remotely located from the NDT device 102 and can be transmitted to the NDT device 102. In some embodiments, the data processor 108 can determine the inspection procedure associated with the asset 116 by processing the received image sensor data using automated image processing and analysis techniques to identify the asset 116. Based on identifying the asset 116, the data processor 108 can query the memory to determine a corresponding inspection procedure to be configured on the NDT device 102.

Step 406 includes determining, by the data processor 108, a user interface configuration of the NDT device 102, the user interface configuration including a graphical interface configuration provided via a graphical user interface displayed on the display 112 of the NDT device 102, and a manual interface configuration corresponding to an actuated interface device 106 of the NDT device 102. In some embodiments, the user interface configuration can be determined based on a stored mapping of user interface configurations associated with inspection procedures. The graphical interface configuration includes a graphical prompt to be displayed via the graphical user interface, the graphical prompt corresponding to a first inspection task included in the inspection procedure. The manual interface configuration includes an actuation input pattern to be received via the actuated interface device, the actuation input pattern corresponding to a second inspection task included in the inspection procedure. The actuated interface device includes at least one of a button, slider, joystick, knob, pointing stick, and touchpad.

Step 408 includes configuring, by the data processor 108, the NDT device 102 to perform the inspection procedure by applying the determined user interface configuration to the NDT device 102.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A method comprising:

receiving, by a data processor of a non-destructive testing (NDT) device, data characterizing a first inspection point and a second inspection point identifying an asset to be inspected using the NDT device;

determining, by the data processor, an inspection procedure associated with the asset based on the inspection points included in the received data, wherein the inspection procedure includes automatically identifying, by the data processor, an area of interest in the asset at each inspection point;

in response to identifying the area of interest in the asset at the first inspection point, determining, by the data processor, a user interface configuration of the NDT device corresponding to the area of interest identified at the first inspection point, wherein the user interface configuration includes:

a first graphical interface configuration provided via a graphical user interface displayed on a display of the NDT device, the first graphical interface configuration including a graphical prompt corresponding to a first inspection task to be performed for the area of interest identified at the first inspection point; and a first manual interface configuration corresponding to an actuated interface device of the NDT device, the first manual interface configuration assigning an actuation input pattern received via the actuated interface to a first workflow including a first plurality of NDT operations for performing the first inspection task;

in response to identifying the area of interest in the asset at the second inspection point, determining, by the data processor, a second user interface configuration of the NDT device corresponding to the area of interest identified at the second inspection point, wherein the second user interface configuration is different from the first user interface configuration and includes:

a second graphical interface configuration including a graphical prompt corresponding to a second inspection task to be performed for the area of interest identified at the second inspection point; and a second manual interface configuration assigning the actuation input pattern to a second workflow including a second plurality of NDT operations for performing the second inspection task, the second plurality of NDT operations being different from the first plurality of NDT operations; and configuring, by the data processor, the NDT device to perform the inspection procedure by applying the determined first and second user interface configurations, such that the actuated interface device is configured to execute the first workflow at the first inspection point and to execute the second workflow at the second inspection point.

2. The method of claim 1, wherein responsive to receiving the actuation input pattern, controlling, by the NDT device, an actuator associated with an image sensor used to perform the inspection procedure.

3. The method of claim 1, wherein the received data is received via an inspection point selection provided via the graphical user interface, the inspection point selection including previously performed inspection procedures associated with the inspection points.

4. The method of claim 1, wherein the received data is received via the image sensor of the NDT device and includes images of the inspection points.

5. The method of claim 4, wherein the received data includes image data of the inspection points captured by the image sensor.

6. The method of claim 1, wherein the actuated interface device includes at least one of a button, slider, joystick, knob, pointing stick, and touchpad.

7. The method of claim 1, wherein the NDT device includes a borescope or a video probe.

8. The method of claim 1, wherein the asset includes at least one of a compressor, a turbine, an engine, or a combustor.

9. A non-destructive testing (NDT) device comprising:

a sensor;

an actuated interface device;

a data processor communicatively coupled to the sensor and the actuated interface device;

a display coupled to the data processor;

a memory coupled to the data processor and storing computer-readable executable instructions, which when executed by the data processor perform operations comprising receive data characterizing a first inspection point and a second inspection point identifying an asset to be inspected using the NDT device;

determine an inspection procedure associated with the asset based on the inspection points included in the received data, wherein the inspection procedure includes automatically identifying, by the data processor, an area of interest in the asset at each inspection point;

in response to identifying the area of interest in the asset at the first inspection point, determine a user interface configuration of the NDT device corresponding to the area of interest identified at the first inspection point, wherein the user interface configuration includes:

a first graphical interface configuration provided via a graphical user interface displayed on the display, the first graphical interface configuration including a graphical prompt corresponding to a first inspection task to be performed for the area of interest identified at the first inspection point; and a first manual interface configuration corresponding to the actuated interface device, the first manual interface configuration assigning an actuation input pattern received via the actuated interface to a first workflow including a first plurality of NDT operations for performing the first inspection task;

in response to identifying the area of interest at the second inspection point, determine a second user interface configuration of the NDT device corresponding to the area of interest identified at the second inspection point, wherein the second user interface configuration is different from the first user interface configuration and includes:

a second graphical interface configuration including a graphical prompt corresponding to a second inspection task to be performed for the area of interest identified at the second inspection point; and a second manual interface configuration assigning the actuation input pattern to a second workflow including a second plurality of NDT operations for performing the second inspection task, the second plurality of NDT operations being different from the first plurality of NDT operations; and configure the NDT device to perform the inspection procedure by applying the determined first and second user interface configurations, such that the actuated interface device is configured to execute the first workflow at the first inspection point and to execute the second workflow at the second inspection point.

10. The NDT device of claim 9, wherein the NDT device controls an actuator associated with the sensor used to perform the inspection procedure, responsive to receiving the actuation input pattern.

11. The NDT device of claim 9, wherein the received data is received via an inspection point selection provided via the graphical user interface, the inspection point selection including previously performed inspection procedures associated with the inspection points.

12. The NDT device of claim 9, wherein the received data is received via an image sensor of the NDT device and includes images of the inspection points.

13. The NDT device of claim 12, wherein the received data includes image data of the inspection points captured by the image sensor.

14. The NDT device of claim 9, wherein the actuated interface device includes at least one of a button, slider, joystick, knob, pointing stick, and touchpad.

15. The NDT device of claim 9, wherein the NDT device includes a borescope or a video probe.

16. A non-transitory computer readable medium having instructions stored therein that, when executed by a microprocessor, causes the microprocessor to perform a method, the method comprising:

receiving, by a data processor of a non-destructive testing (NDT) device, data characterizing a first inspection point and a second inspection point identifying an asset to be inspected using the NDT device;

determining, by the data processor, an inspection procedure associated with the asset based on the inspection points included in the received data, wherein the inspection procedure includes, automatically identifying, by the data processor, an area of interest in the asset at each inspection point;

in response to identifying the area of interest in the asset at the first inspection point, determining, by the data processor, a user interface configuration of the NDT device corresponding to the identified area of interest identified at the first inspection point, wherein the user interface configuration includes:

a first graphical interface configuration provided via a graphical user interface displayed on a display of the NDT device, the first graphical interface configuration including a graphical prompt corresponding to a first inspection task to be performed for the area of interest identified at the first inspection point; and a first manual interface configuration corresponding to an actuated interface device of the NDT device, the first manual interface configuration assigning an actuation input pattern received via the actuated interface to a first workflow including a first plurality of NDT operations for performing the first inspection task;

in response to identifying the area of interest in the asset at the second inspection point, determining, by the data processor, a second user interface configuration of the NDT device corresponding to the area of interest identified at the second inspection point, wherein the second user interface configuration is different from the first user interface configuration and includes:

a second graphical interface configuration including a graphical prompt corresponding to a second inspection task to be performed for the area of interest identified at the second inspection point; and a second manual interface configuration assigning the actuation input pattern to a second workflow including a second plurality of NDT operations for performing the second inspection task, the second plurality of NDT operations being different from the first plurality of NDT operations; and configuring, by the data processor, the NDT device to perform the inspection procedure by applying the determined first and second user interface configurations, such that the actuated interface device is configured to execute the first workflow at the first inspection point and to execute the second workflow at the second inspection point.

17. The method of claim 5, wherein the NDT operations include at least one of: applying an image adjustment to the image data captured by the image sensor, selecting a measurement type, and placing measurement cursors in the image data.

18. The NDT device of claim 13, wherein the NDT operations include at least one of: applying an image adjustment to the image data captured by the image sensor, selecting a measurement type, and placing measurement cursors in the image data.

* * * * *